(12) United States Patent
Baum

(10) Patent No.: US 7,871,052 B2
(45) Date of Patent: Jan. 18, 2011

(54) FLEXIBLE COVER HOLD DOWN SYSTEM

(76) Inventor: John Baum, 44128 Nisqually Ridge Dr. East, Eatonville, WA (US) 98328-9218

( * ) Notice: Subject to any disclaimer, the term of this patent is extended or adjusted under 35 U.S.C. 154(b) by 295 days.

(21) Appl. No.: 12/214,395

(22) Filed: Jun. 17, 2008

(65) Prior Publication Data

US 2009/0235496 A1 Sep. 24, 2009

Related U.S. Application Data

(60) Provisional application No. 61/069,954, filed on Mar. 18, 2008.

(51) Int. Cl.
A47B 97/00 (2006.01)

(52) U.S. Cl. .................. 248/505; 248/500; 52/2.24; 52/2.25; 52/3; 52/23; 135/115; 135/119

(58) Field of Classification Search .................. 248/500, 248/505; 52/2.24, 2.25, 3, 5, 23; 4/498, 4/499, 503; 206/83.5; 135/115, 119
See application file for complete search history.

(56) References Cited

U.S. PATENT DOCUMENTS

| | | | | |
|---|---|---|---|---|
| 3,523,308 A | * | 8/1970 | Bradley | 4/503 |
| 3,732,581 A | * | 5/1973 | Pitti et al. | 4/503 |
| 5,097,638 A | * | 3/1992 | Jones | 52/3 |
| 5,388,313 A | * | 2/1995 | Cameron | 24/537 |
| 5,520,364 A | * | 5/1996 | Bloxson et al. | 248/500 |
| 6,698,071 B1 | * | 3/2004 | Greer et al. | 24/537 |
| 7,434,356 B2 | * | 10/2008 | Morris | 52/2.11 |
| 2003/0208963 A1 | * | 11/2003 | Morris | 52/2.23 |
| 2004/0194393 A1 | * | 10/2004 | Horman | 52/3 |
| 2006/0150537 A1 | * | 7/2006 | Baum et al. | 52/90.1 |

\* cited by examiner

*Primary Examiner*—Terrell Mckinnon
*Assistant Examiner*—Bradley H Duckworth
(74) *Attorney, Agent, or Firm*—Dean A. Craine

(57) ABSTRACT

An adjustable cover hold down system designed to be used with an awing cover or a tarp that includes a flexible elongated body capable of being rolled into a compact roll during storage and then unrolled prior to being used. The system includes a plurality of clips designed to attach to an enlarged, longitudinally aligned, perimeter beaded edge that extends the entire length of the body. The clips may include adjustable clamp, a hook clip or an elongated traveler that enables them to be attached to the lower free edge of a trap, a tarp gusset, or the slot formed on a roller bar used on an awning cover, respectively. The body includes a bladder with at least one port opening with a removable cap that allows the bladder to be selectively filled with different volumes of a fluid material, such as water or sand.

7 Claims, 11 Drawing Sheets

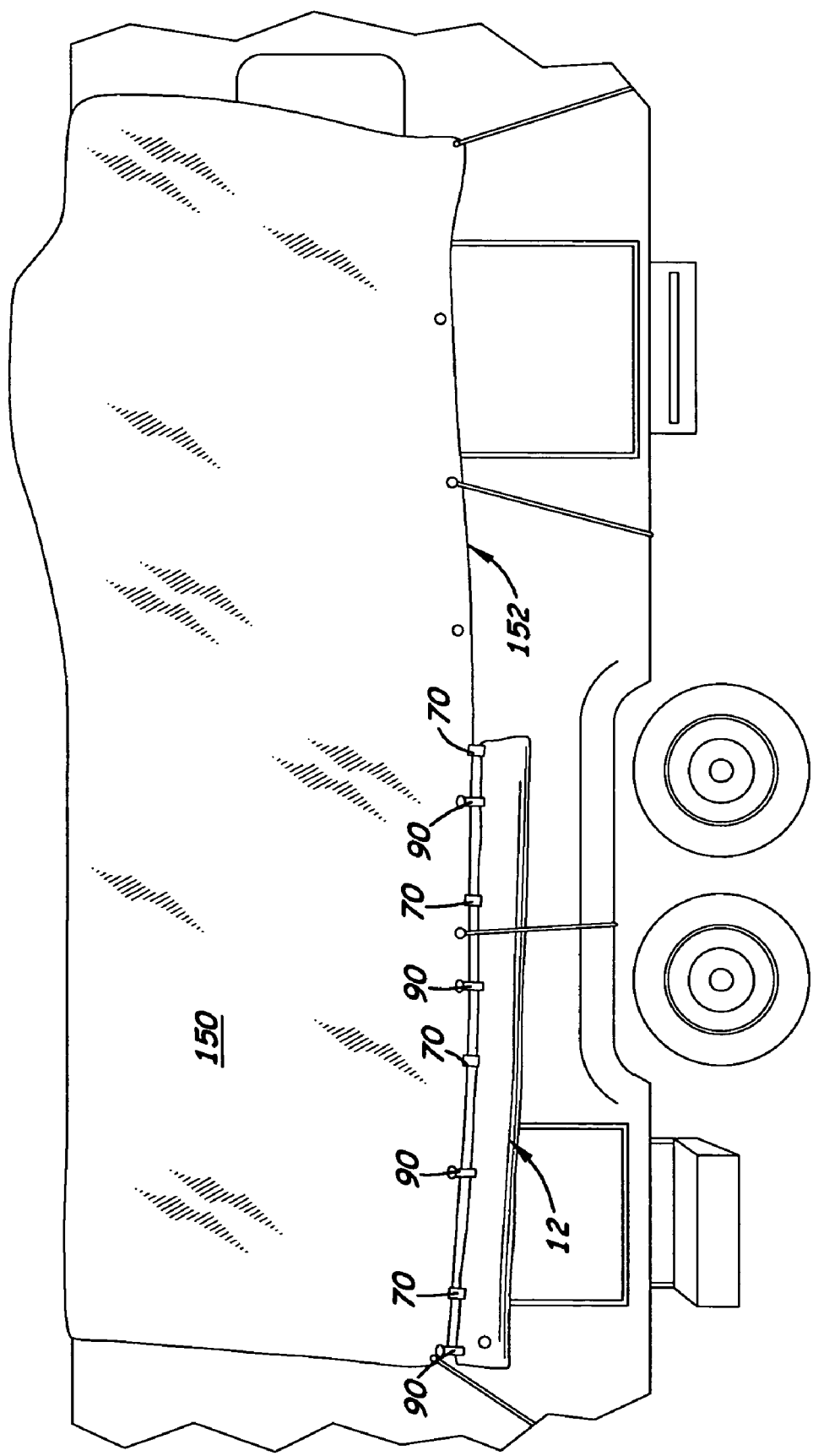

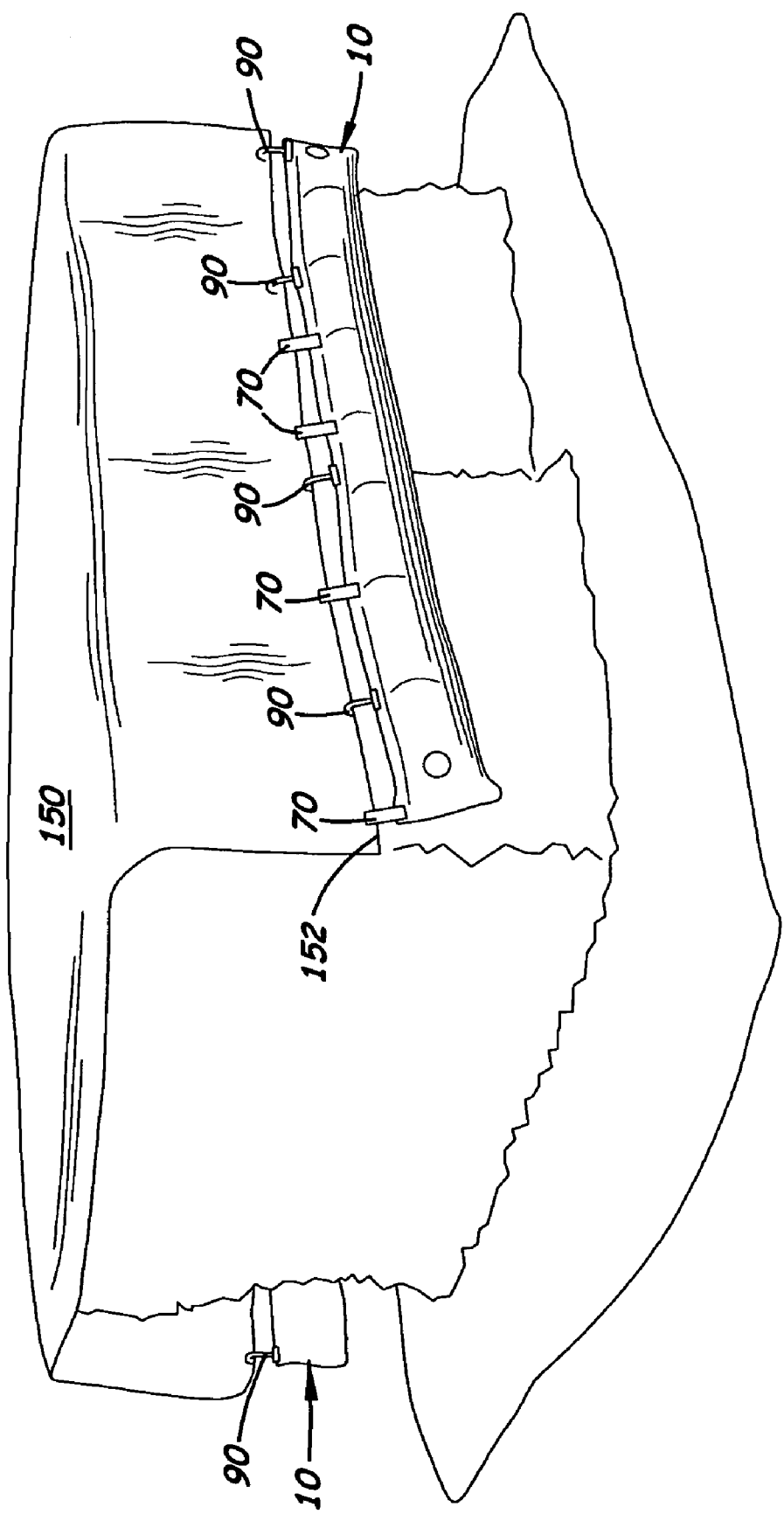

US 7,871,052 B2

FLEXIBLE COVER HOLD DOWN SYSTEM

This is a utility patent application which claims benefit of U.S. Provisional Application No. 61/069,954 filed on Mar. 18, 2008.

BACKGROUND OF THE INVENTION

1. Field of the Invention

This invention relates to devices used to hold down tarps, awning covers and thin roof panels to prevent their removal or damage from high winds.

2. Description of the Related Art

Retractable awnings on buildings, trailers and RV's are very common. Such structures typically include a flexible roof panel that is rolled and unrolled from a roller bar that is stored in a horizontally aligned header box mounted on the surface of the building, trailer or RV. To extend the awning, the roller bar is removed from the header box and pulled outward. As the roller bar is pulled outward, the roof panel is slowly unrolled from the roller bar. After the roof panel has been unrolled to its desired length, vertical legs are installed under the ends of the roller bar to hold the installed under the ends of the roller bar to hold the roller bar in a fixed, elevated position. The down ropes or rigging is often used to keep the legs vertically aligned so that the roof panel remains taunted.

Because the roof panel is made of lightweight fabric or vinyl and because the roller bar is relatively light, they can be easily damaged by high winds. Most owners will retract the awning when high winds are forecasted. Unfortunately during calm wind conditions, sudden, unexpected high gusts may occur. To prevent damage caused by these unexpected, high gusts, rocks and sand bags are sometimes placed around the base of the vertical legs to prevent lifting. Sometimes, additional ropes may be attached to stakes driven into the ground to hold the ends of the roller bar down. Unfortunately, rocks, sandbags and ropes do not evenly distribute a downward force over the entire length of the roller bar which can cause the roller bar to bend. Another drawback with using rocks, sandbags and ropes is that installation and removal of these items are time consuming and become another item to store when traveling.

Tarps are often draped over objects located outdoors to protect the objects from U.V. light, wind, rain and snow. Tarps often include grommets evenly spaced apart along their edges to which ropes, elastic straps or cords may be attached to hold the tarp in place around the object. Because the grommets are located in fixed locations along the edge of the tarp, the amount of force exerted on the grommets may vary depending on the shape of the object. Gradually, the uneven distribution of forces may cause some of the grommets to tear away.

What is needed is a hold down system for a retractable roof or a tarp that stores in a compact configuration when not in use, can be easily assembled and installed, and that evenly distributes an anchoring weight along a desired edge to hold the retractable roof or tarp in place place during low to moderate winds.

SUMMARY OF THE INVENTION

The above stated objects and other objects that may become apparent are met by the hold down system designed to be used with a lightweight cover to hold the cover down during low to moderate wind conditions. The system includes a flexible elongated body capable of being rolled into a compact roll for storage and then unrolled prior to being used. The elongated body includes a large, continuous bladder designed to be filled with a desired fluid to provide weight and mass. The elongated body includes at least one laterally extending attachment edge that runs substantially its entire length.

The laterally extending attachment edge includes a flexible, thin longitudinally aligned webbing element with an enlarged, reinforced perimeter beaded edge. The perimeter beaded edge is circular in cross-section and extends the entire length of the elongated body. During assembly, a plurality of clips is selected each including a complimentary-shaped, u-shaped receiver formed on one end designed to slidingly engage the beaded edge. The perimeter beaded edge and the clips are made of material designed to hold the elongated body in a suspended position from the roller bar or from the lower free edge of an awning roof panel or tarp, or from gussets or ropes used with a tarp when filled with a desired fluid.

Disclosed therein are three different types of clips having three different types of connectors attached to their ends opposite the u-shaped receiver. The connectors allow the clips to attach to the slot formed on the roller bar used with a retractable awning cover, the free end of an awning cover or tarp, or to the gussets or ropes used with a tarp.

Using the above-described system, a method for temporarily holding down a tarp or awning cover is provided.

DESCRIPTION OF THE DRAWINGS

FIG. 16 is a side elevational view of a tarp held over a trailer with an elongated body.

FIG. 17 is a perspective view of a pile of hay covered by a tarp and held down with two elongated bodies.

DESCRIPTION OF THE PREFERRED EMBODIMENT(S)

Figure 1:
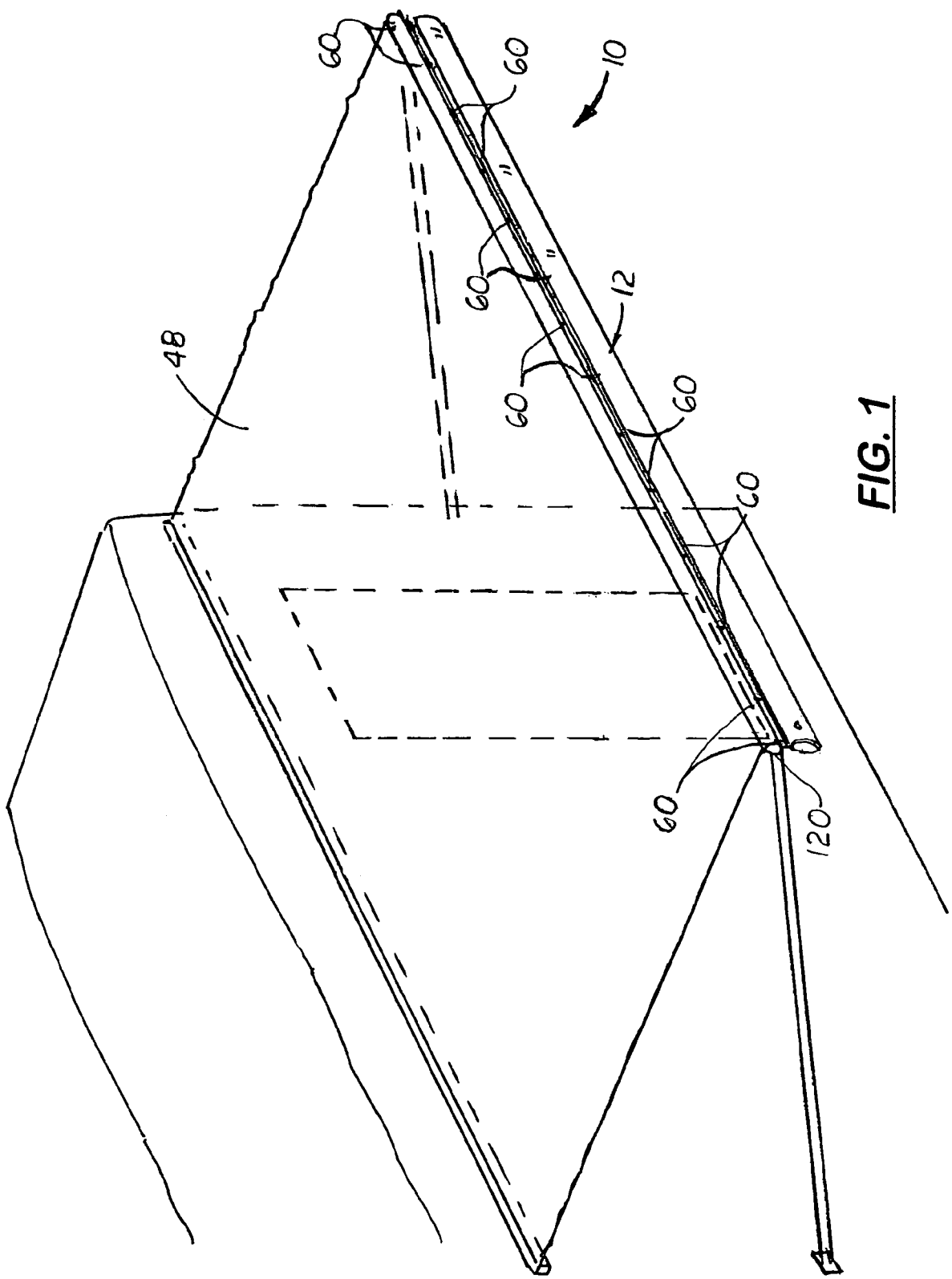
FIG. 1 is a perspective view of a trailer with a retractable cover with the hold down bladder attached to the roller bar.
Figure 2:
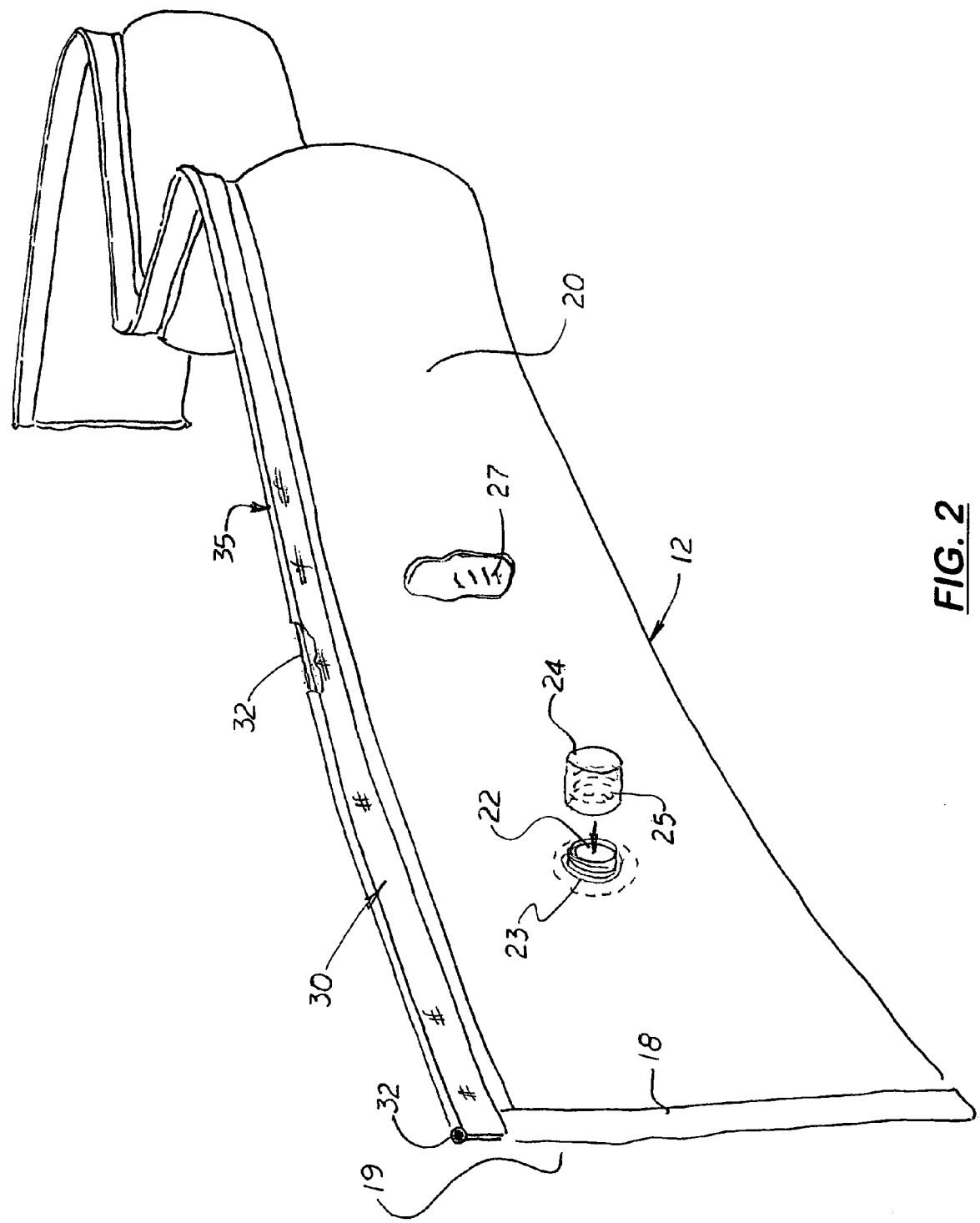
FIG. 2 is a perspective view of the elongated body with the beaded perimeter edge.
Figure 15:
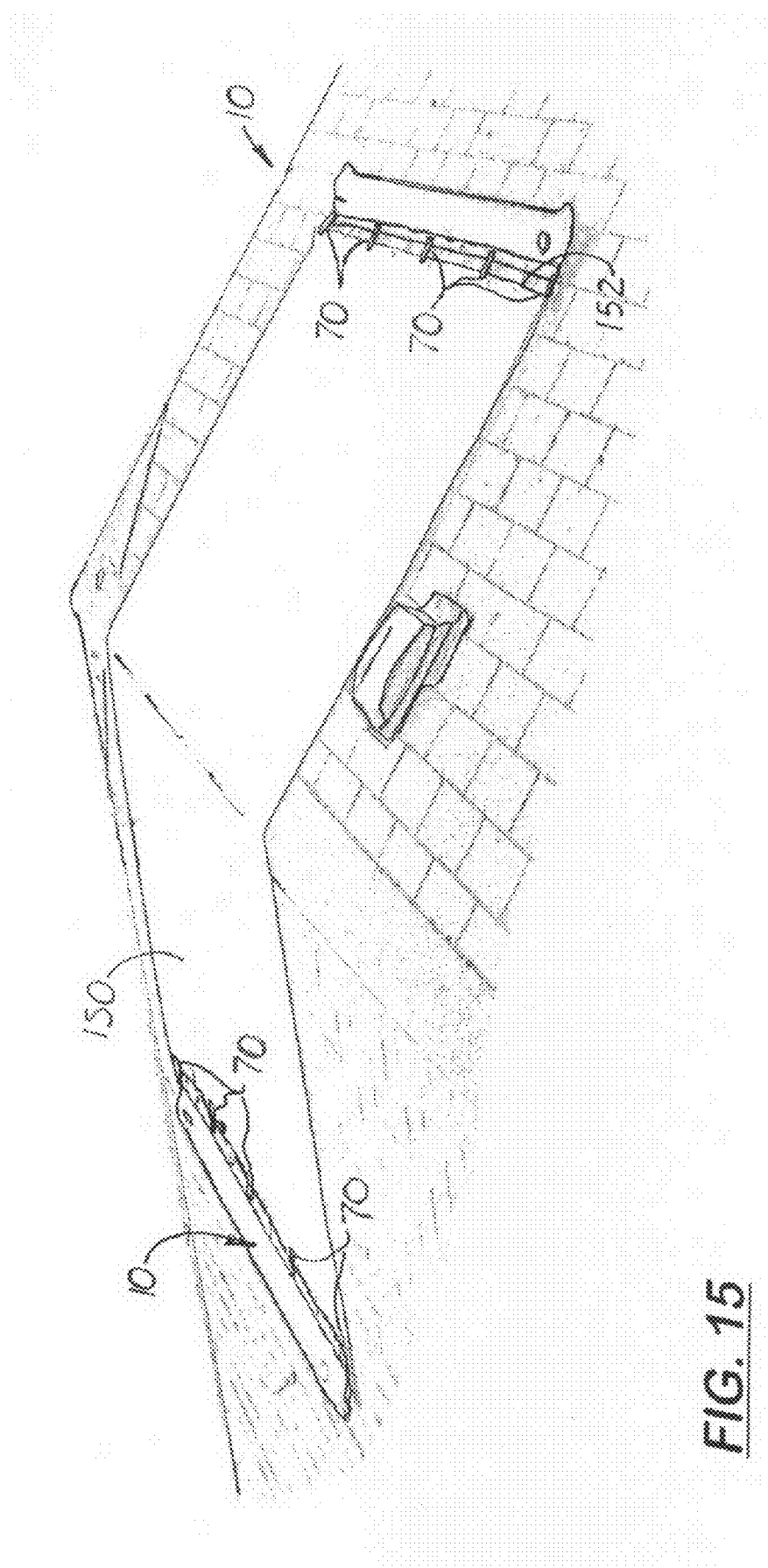
FIG. 15 is a perspective view of a roof showing a trap held down over the roof with two elongated bodies.

Referring to the Figs, there is shown a cover hold down system 10 that includes a flexible elongated body 12 capable of being rolled into a compact roll during storage and then unrolled into an extended configuration for use for attachment to the roller bar 120 (see FIG. 1) on a retractable awning cover or to the free edge of a tarp draped over an object (see FIGS. 15-17). The system 10 includes a plurality of clips 60, 70, 90 designed to attach to an enlarged, longitudinally aligned, perimeter beaded edge that extends the entire length of the elongated body 12. Each clip 60, 70, 90 includes a means for connecting to the perimeter beaded edge. The clips 60, 70 and 90 also include at the opposite ends either an elongated traveler designed to engage the slot on roller bar 120, an adjustable clamp assembly 76, or a D-ring connector 96.

The elongated body 12 is made of durable, flexible material designed to be used outdoors in different climate conditions. In the preferred embodiment, the elongated body 12 is rectangular, approximately 72 to 144 inches in length, and 6 to 12 inches in diameter. In the preferred embodiment, the elongated body 12 is made of two, lightweight, flexible vinyl panels 18, 19, adhesively or heat sealed along its edges. Formed on the elongated body 12 is a large, longitudinally aligned bladder 20. Formed on the bladder 20 is at least one port opening 22 and a removable cap 24 that allows the user to selectively fill the bladder 20 with a suitable fluid material 27 to provide a weight and mass. In the preferred embodiment, the port opening 22 is port opening 22 is approximately 1½ inches in diameter and includes external threads 23 that connect to compatible internal threads 25 in the cap 24.

In the preferred embodiment, the bladder 20 is cylindrical in cross-section and designed to hold approximately 1 gallon of fluid material 80 per 24 inches of length. When water is used as a fluid material 150, the device weights approximately 8 lbs per 24 inches in length which is an optimum amount of tensile force applied to a tarp.

Formed on one side of the bladder 20 is a wide webbing element 30. In the preferred embodiment, the webbing element 30 is a two-ply structure that is folded nylon cord 32 and adhesive attached or electrically welded to the perimeter edge of the elongated body 12. The nylon cord 32 is a continuous structure and forms a continuous perimeter beaded edge 35 on one side of the elongated body 12. In the preferred embodiment, the two-ply webbing element extends laterally and uniform in width from the side of the bladder 20 approximately 1 to 3 inches. The nylon cord 32 is 3/16 to ¼ inch in diameter disposed in parallel alignment with the elongated body's longitudinally axis 14.

As stated above, the system 10 is designed so that the elongated body 10 may be used with different clips each designed to connect to the perimeter beaded edge 35 and extend perpendicularly from the perimeter beaded edge 35 and hang the elongated body 12 horizontally from a roller bar 120, the free edge of an awning cover or tarp 150, or to the gussets located around the edge of a tarp 150.

FIGS. 3, 6-8 show a first embodiment of a clip, designated 60, designed to connect to the perimeter beaded edge 35 and to a slot 122 formed on a typical roller bar 120 used with a retractable awning roof system 125. The clip 60 includes an elongated U-shaped receiver 62 designed to slide longitudinally over and capture the perimeter beaded edge 35. In the preferred preferred embodiment, the U-shaped receiver 62 is cylindrical with an outer diameter approximately ⅜ inch. The overall length of the receiver 62 is approximately 1½ inches in length. Formed on the inside of the receiver 62 is a longitudinally aligned passageway 63 designed to receive the perimeter beaded edge 35. Formed on the bottom surface of the U-shaped receiver 62 is a slot 64 through which the webbing element 30 may extend. The passageway 63 is slightly larger than the perimeter beaded edge 35 and the slot 64 is slightly larger than the webbing element 30 that enables the clip 60 to slide to different locations along the elongated body 12.

Figure 3:
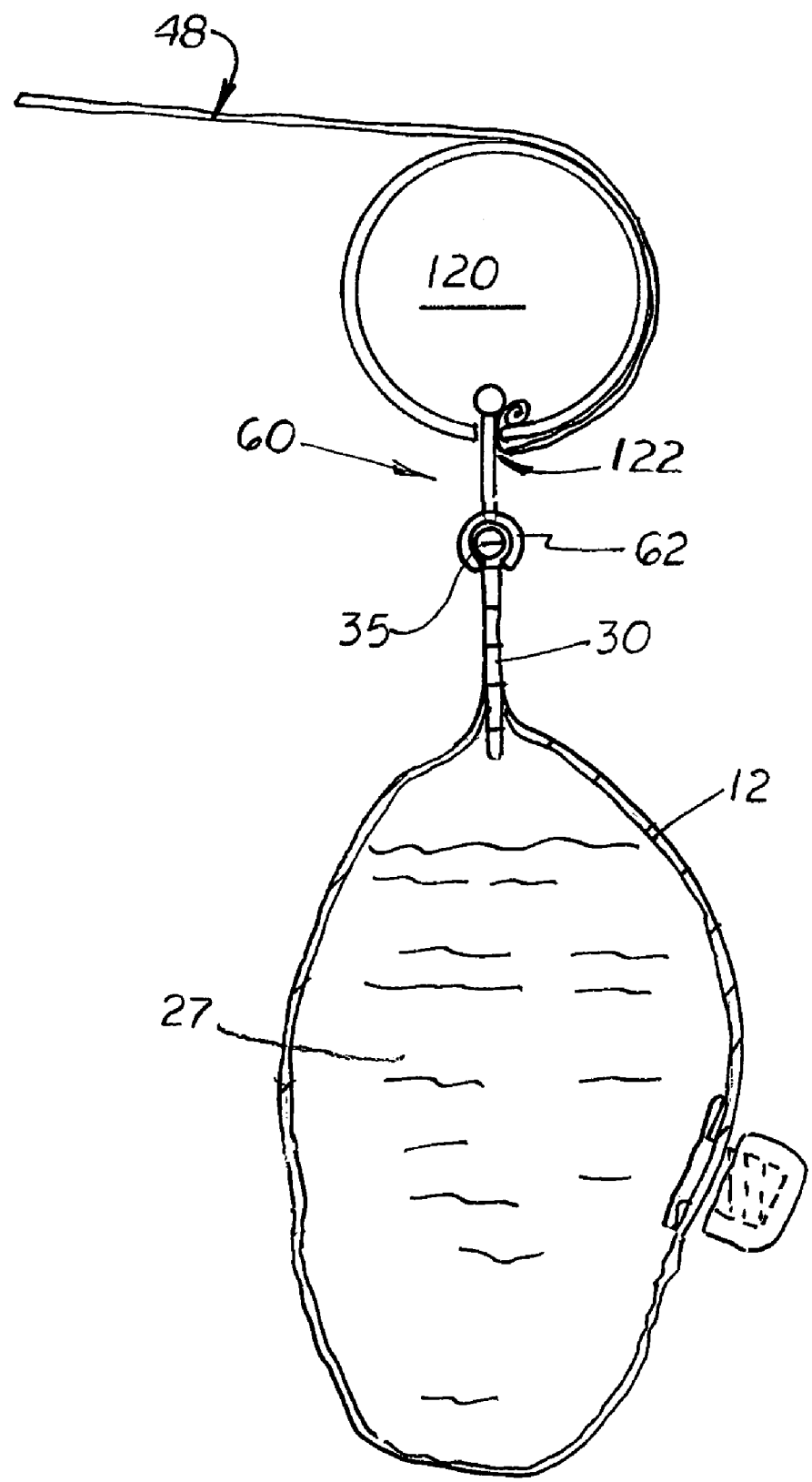
FIG. 3 is a sectional side elevational view of an elongated body attached the lower slot on a roller bar with traveler-style clips.
Figure 4:
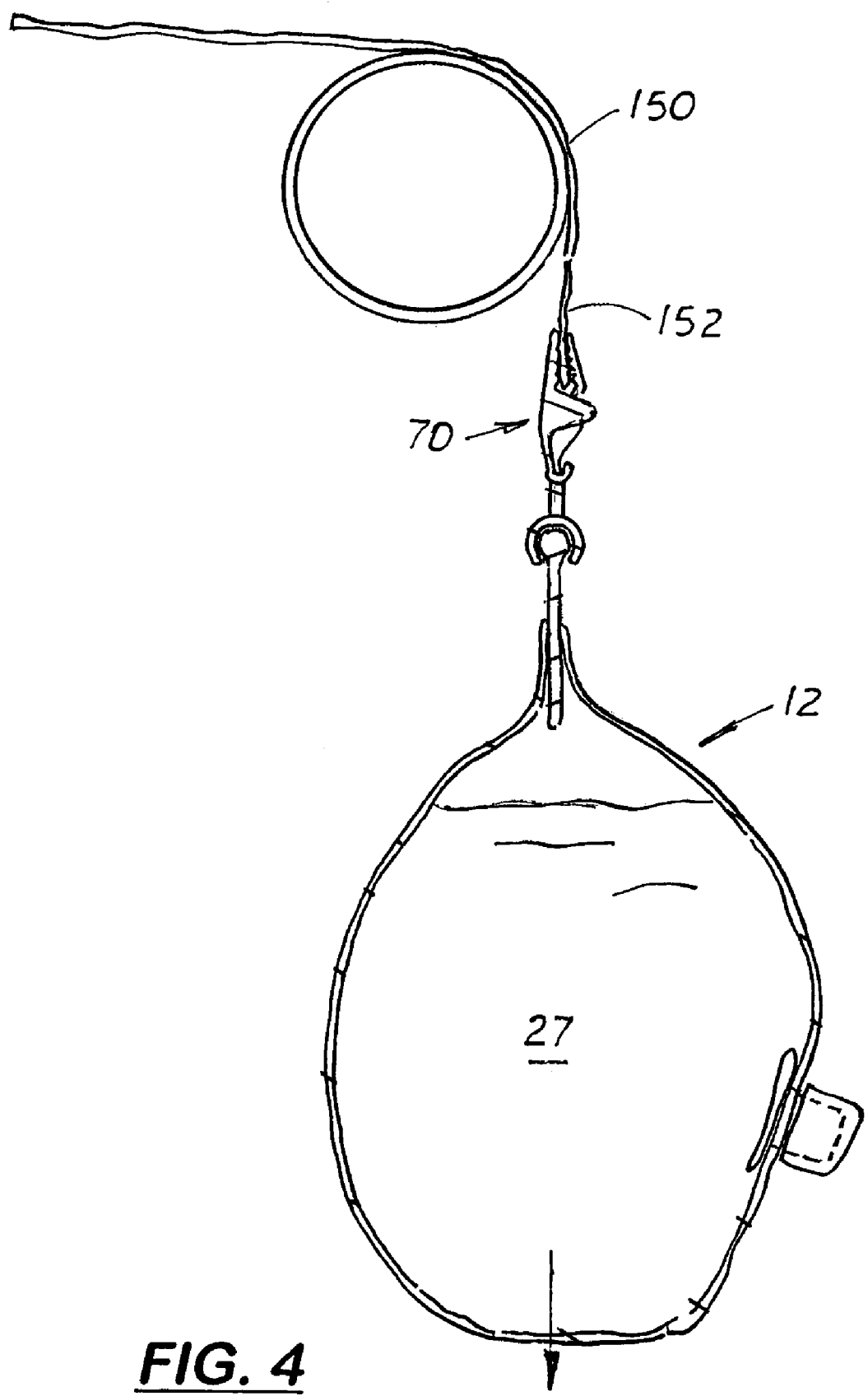
FIG. 4 is a sectional side elevational view of the cover draped over the top of a roller bar with the bladder attached to the free edge of the cover with adjustable jaw clips.
Figure 5:
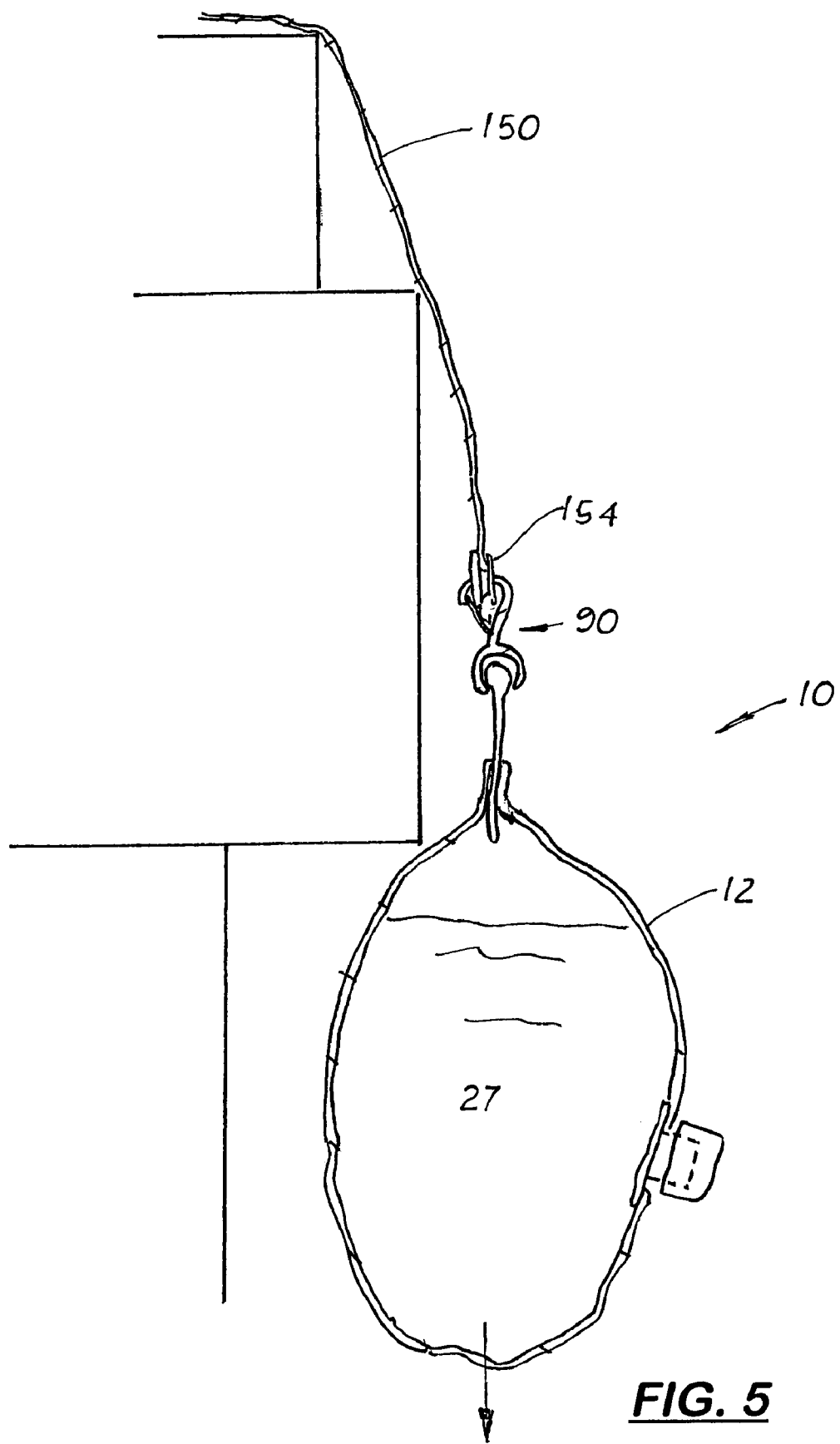
FIG. 5 is a sectional side elevational view of a tarp placed over stacked objects with the bladder attached to the free edge of the tarp via D-ring clips.
Figure 6:
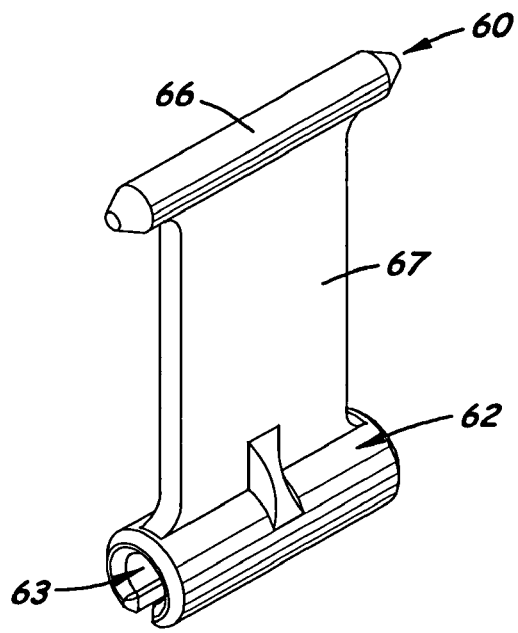
FIG. 6 is a perspective view of a travel-style clip.
Figure 7:
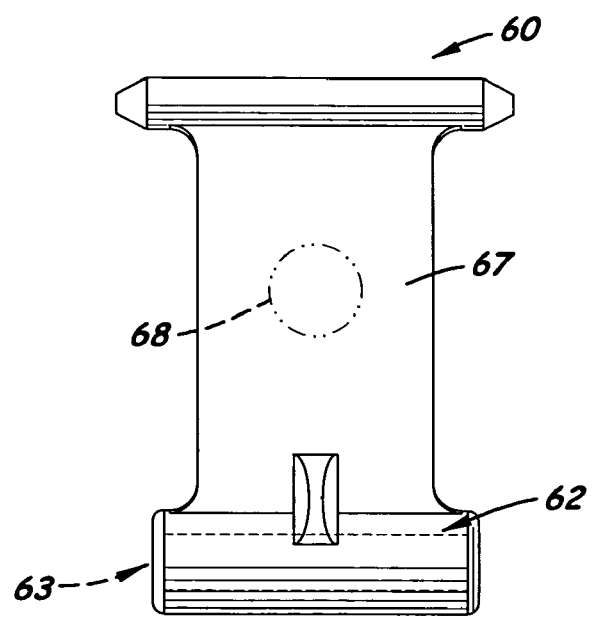
FIG. 7 is a front elevational view of a traveler-style clip.
Figure 8:
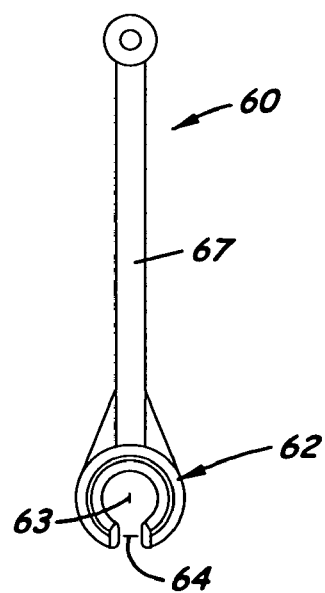
FIG. 8 is a side elevational view of a traveler-style clip.

Formed on the opposite end of the clip 60 is an elongated traveler 66 aligned in a parallel configuration with the U-shaped receiver 62. The traveler 66 is designed to slide and engage the slot 122 formed on lower surface of a standard roller bar 120 used with a retractable roof. The traveler 66 is an elongated, cylindrical structure approximately 1¼ inches in length and 3/16 inch in diameter. The opposite ends of the traveler 66 are beveled outward so that the travel 66 does not snag the inside edge of the roller bar 120 or the awning cover 48. Extending between the receiver 62 and the traveler 66 is a thin center support 67 that measures approximately 1 inch wide, 1¾ inches in length, and ⅛ inch thick. In the preferred embodiment, the center support 67 is integrally formed or attached to the top surface of the receiver 62 and integrally formed or attached to the bottom surface of the traveler 66. The center support 67 is sufficiently thin to slide freely in the slot 122 formed on the roller bar 120 as shown in FIG. 3. An optional hole 68 may be formed on the central support 67 to allow a rope or cord to attach to the clip 60.

During assembly, the elongated body 12 is oriented so that the perimeter beaded edge 35 is positioned above the bladder 20 and parallel to the roller bar 120. The clip 60 is then perpendicularly aligned so that the slot 64 on the receiver 62 on each clip 60 is oriented downward and engages the perimeter beaded edge 35. The slot 64 formed in the receiver 62 enables the webbing element 30 to extend through so that the clip 60 may slide freely over the perimeter beaded edge 35. Ropes or cords may then be attached to some or all of the holes 68 formed on the clips 60 to provide additional support and wind resistance.

Figure 9:
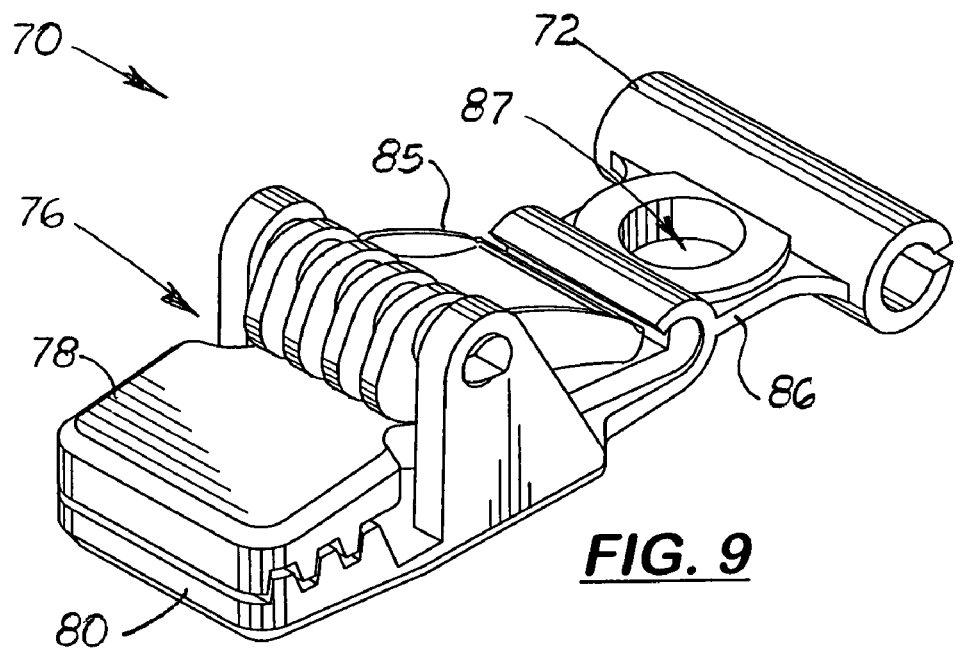
FIG. 9 is a perspective view of an adjustable clamp clip.
Figure 10:
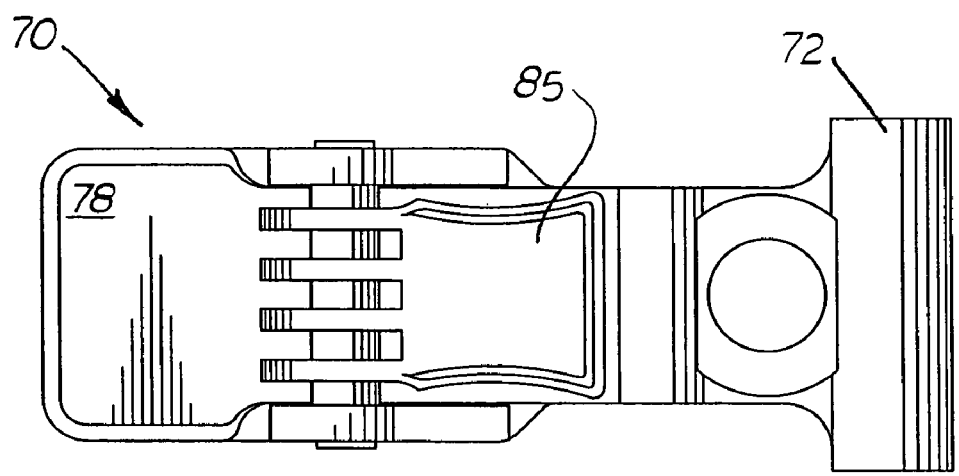
FIG. 10 is a top plan view of the adjustable clamp clip shown in FIG. 9.
Figure 11:
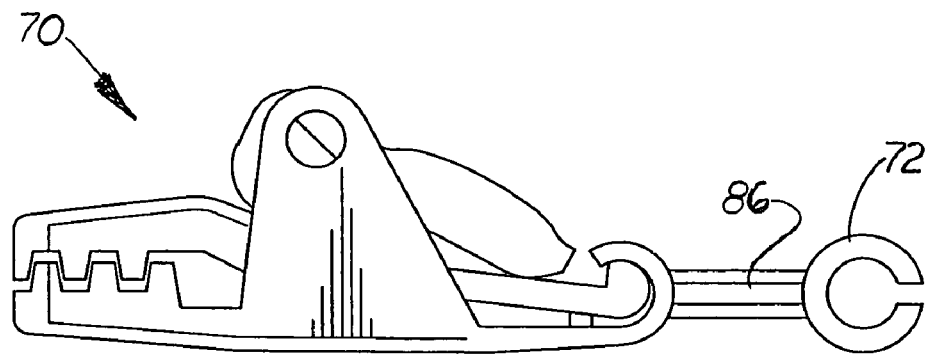
FIG. 11 is a side elevational view of the adjustable clamp clip shown in FIGS. 9 and 10.

FIGS. 9-11 show a second embodiment of the clip, designated 70, with a U-shaped receiver 72 formed on one end identical to the receiver 62 used on the clip 70 that also connects to the perimeter beaded edge 35. Formed on the opposite end of the clip 70 is an adjustable clamp assembly 76 that replaces the traveler 66. The clamp assembly 76 includes two jaws 78, 80 designed to press together against a thin free edge on a cover or trap. The clamp includes two jaws 78, 80 and a rotating cam 85 that presses the two jaws 78, 80 together when attaching to a free edge. An optional hole 87 may be formed on the flat section 86 between the U-shaped receiver 72 and the clamp assembly 76 to allow rope or a clamp to attach to the clip 70. Clip 70 is especially useful for attaching the elongated body 12 to the free end of a panel as shown in FIG. 15-17 or to the lower edge of a tarp draped over an object.

Figure 12:
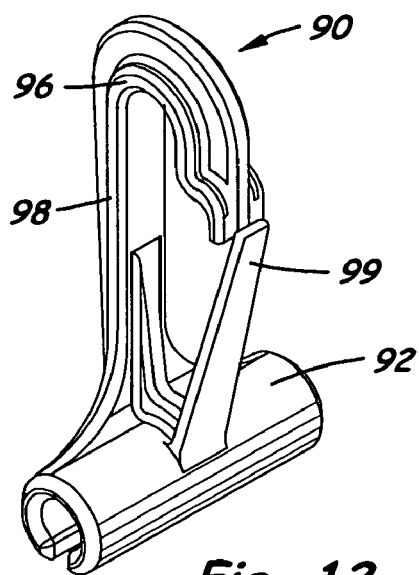
FIG. 12 is a perspective view of a D-ring clip.
Figure 13:
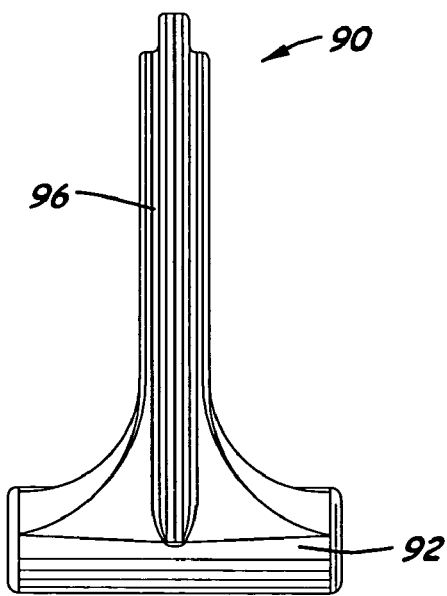
FIG. 13 is a side elevational view of the D-ring clip shown in FIG. 12.
Figure 14:
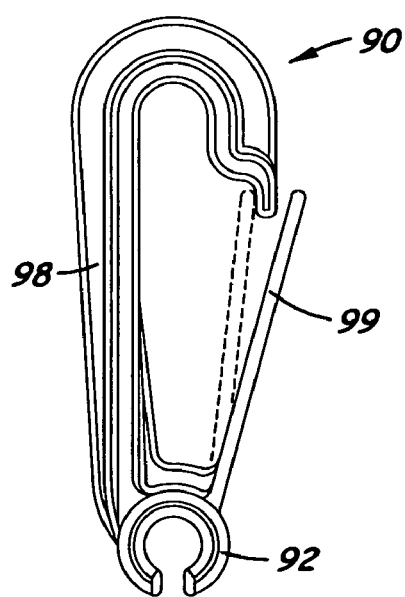
FIG. 14 is a front elevational view of the D-ring clip shown in FIGS. 11 and 12.

FIGS. 12-14 show a third embodiment of the clip, designated 90, designed specifically for connection to a gusset or rope attached to a roof cover or tarp. On clip 90, a D-ring connector 96 perpendicularly aligned on the top surface of the U-shaped receiver 92. The D-ring connector 96 includes an inverted J-shaped elongated body 98 with a straight tongue member 99 that extends upward and engages the lower tip of the J-shaped elongated body 98. In the preferred embodiment, the D-ring connector 96 is rotated so that its longitudinal axis is approximately 90 degrees from the longitudinal axis of the U-shaped receiver 92 which allows the D-ring connector allows the D-ring connector 96 to engage a grommet oriented in the same place as the elongated body 12.

During use, the clips 60, 70 or 90 are first attached to the elongated body 12 by sliding the U-shaped receivers 62, 72, 92, respectively, over the perimeter beaded edge 35. In the preferred embodiment, the clips 60, 70, and 90 are evenly spaced apart over the perimeter beaded edge 35. With the roller bar-style clips 60, the traveler 66 on each clip 60 is then individually aligned over the end of the slot 122 opening on the roller bar and slid into the slot. The elongated body 12 is then pulled longitudinally until the entire elongated body 12 is extended and supported by the roller bar. With the adjustable clamp-style clips 70, the elongated body 12 is lifted so that the two clamping jaws 78, 80 can be attached to the free edge 152 of a cover or tarp 150. With the D-ring style clip 90, the clips 90 are adjusted along the length of the elongated body so that the clips 90 may attach to a gusset 154 or rope (not shown).

After the clips 60, 70, 90 have been attached to the elongated body 12 and the clips 60, 70, 90 have then been attached to the roller bar 120, or to the free edge 152 of a cover or tarp 150, or to a gusset 154 or a rope, the cap 24 is then removed from the port 22 and a desirable fluid 27 is then poured into the bladder 20. The amount of fluid 27 added to the bladder 20 depends on the desired amount of weight needed to hold the cover or tarp 150 in place.

FIG. 15 is a perspective of a roof showing a tarp held down over the roof with two elongated bodies.

FIG. 16 is a side elevational view of a tarp held over a trailer with an elongated body 10.

FIG. 17 is a perspective view of a pile of hay covered by a tarp held down with two elongated bodies.

Using the above described system 10, a method for holding down a retractable awning is provided that includes the following steps:

a. selecting an elongated body, said body includes a longitudinally aligned bladder with continuous webbing extending laterally on one edge, said webbing including a beaded edge, said bladder includes at least one port opening enabling said bladder to be filled with a desired fluid, said body including a cap attached to said port opening enabling said port opening to be selectively opened or closed;

b. selecting a plurality of clips capable of attaching said beaded edge of said elongated body to said roller bar;

c. unfolding said elongated body;

d. attaching said two clips to said beaded edge on said elongated body;

e. attaching the opposite ends of each said clip to said roller bar;

f. removing said cap from said port opening;

g. filling said port opening on said bladder with sufficient amount of fluid to hold down said awning; and, h. attaching said cap to said port opening until closed.

In compliance with the statute, the invention described herein has been described in language more or less specific as to structural features. It should be understood however, that the invention is not limited to the specific features shown, since the means and construction shown is comprised only of the preferred embodiments for putting the invention into effect. The invention is therefore claimed in any of its forms or modifications within the legitimate and valid scope of and valid scope of the amended claims, appropriately interpreted in accordance with the doctrine of equivalents.

I claim:

1. A hold down system comprising:
   a. a flexible elongated body capable of being stored in a compact roll, said elongated body includes a bladder capable of holding a desired fluid material, said elongated body includes at least one laterally extending webbing with an enlarged, continuous beaded perimeter edge, said bladder includes at least one port opening enabling said bladder to be filled with a desired fluid, said body includes a removable cap capable of being selectively attached to said port opening thereby enabling said bladder to be selectively opened or closed;
   b. a plurality of clips each including at one end an elongated, u-shaped receiver that slides longitudinally over and engages said beaded perimeter edge to connect said clip to said elongated body, each said clip includes at an opposite end a means for attaching said clip to a secondary structure to be held down by said bladder when filled with fluid material, and
   c. a secondary structure located adjacent to said elongated body, said secondary structure connected to said means for attaching said clips to a secondary structure on each said clip to connect said elongated body to said secondary structure.

2. The hold down system as recited in claim 1, wherein said means for attaching said clip to a secondary structure is an adjustable clamp assembly.

3. The hold down system as recited in claim 2, wherein said adjustable clamp assembly includes two jaws selectively forced together by a cam lever.

4. The hold down system as recited in claim 1, wherein said means for attaching said clip to a secondary structure is a hook clip.

5. The hold down system as recited in claim 3, wherein each said clip assembly includes a center leg that extends between said clamp assembly and said elongated, U-shaped receiver with at least one hole formed in said center leg design to receive a rope or cord.

6. The hold down device as recited in claim 1, wherein said elongated body is six to 12 feet in length.

7. The hold down device as recited in claim 1, wherein said port opening is a cylindrical threaded neck and sufficient width to receive a inch garden hose.

\* \* \* \* \*